ated Sept. 23, 1969

3,468,864
OIL SOLUBLE ALKARYL SULFONATE LITHIUM AND POLYVALENT METAL SALTS IN POLYOLEFIN FIBERS AND FILMS
Orwin G. Maxson and Wayne R. Sorenson, Ponca City, Okla., assignors to Continental Oil Company, Ponca City, Okla., a corporation of Delaware
No Drawing. Filed Oct. 18, 1965, Ser. No. 497,534
Int. Cl. C08f 45/66, 45/46
U.S. Cl. 260—93.7   7 Claims

ABSTRACT OF THE DISCLOSURE

Polyolefin compositions containing 0.5 to 20 weight percent of oil-soluble metal alkaryl sulfonate.

In one aspect, the disclosure concerns an improved method of dyeing polyolefins wherein the improvement comprises use of the above-described composition.

---

This invention relates to crystalline polyolefin compositions capable of providing piece-dyeable substrates, including the multifilament forms thereof, and to a method for dyeing said substrates. More particularly, the invention concerns fiber-forming polyolefins, especially polypropylene, containing a homogeneously dispersed oil-soluble alkaryl sulfonate serving as dye sites for a subsequently applied water-soluble cationic dye.

Much effort has recently been directed toward the development of synthetic fibers from the high molecular weight crystalline polymers of α-olefins, particularly propylene. It now appears that the use of crystalline polypropylene for this purpose is destined to be of considerable commercial importance because fibers of this polymer exhibit certain desirable properties which are not noteworthily associated with the other important synthetics such as the nylons, polyesters and acrylics. Substantial commercial utilization of polypropylene fibers in multifilament form, however, has been seriously hampered for lack of an acceptable method for piece-dyeing this product. In common with the previously developed synthetic fibers, polypropylene fibers are inherently difficult to dye. Needless to say, the technology for dyeing the various commercial synthetic fibers has for some time now advanced to a highly developed state and the problems faced initially in this regard have been solved. Unfortunately, this technology has hitherto been found to have very little practical applicability in the dyeing of polypropylene fibers.

We have successfully bridged this gap by devising a way for readily utilizing a commercially available class of fast dyes for piece-dyeing polypropylene fibers. The dyes suitable in the practice of this invention are the cationic, and sometimes referred to as basic dyes, conventionally employed in the dyeing of acrylic fibers. These dyes are structurally characterized in containing one or more basic nitrogen groupings. Beyond this, the knowledge of the chemical structure of these dyes is largely proprietary. As indicated, however, the dyes useful herein are commercial products and are known in the trade as acrylic dyes, meaning that they have been primarily developed and offered for universal application in the dyeing of acrylic based fibers. Exemplary commercial dyes of this type are described in the working examples to follow.

We have discovered that polypropylene as well as the other similar fiber-forming polyolefins obtained by polymerizing $C_4$–$C_6$ α-olefins such as poly (3-methylbutene-1), poly (4-methylpentene-1) and poly (butene-1) can be converted to a dyeable substance by the inclusion therein of a minor amount of compatible organic sulfonate capable of complexing with the aforementioned dyes in a conventional dyeing procedure. In this manner, the sulfonate salt behaves very much like the mordants employed in mordant dyeing. The sulfonate salts useful in the practice of this invention, unlike conventional mordants, are molecularly distributed throughout the polymer itself and thus, the usual step of applying the mordant is obviated. The sulfonate component besides furnishing a molecularly uniform distribution of dye sites also improves certain physical properties of the polymer, such as its ultimate tensile strength and elongation properties. Moreover, the sulfonate salt functions as a processing aid upon converting the polymer to fibers.

It is accordingly the principal object of this invention to provide crystalline poly α-olefin compositions whose substrates, including multifilament forms thereof, are piece-dyeable.

Another object of this invention is to provide a fiber-forming polyolefin composition containing a molecularly dispersed organic sulfonate salt serving as dye sites for a subsequently applied water-soluble cationic dye.

A further object is to improve certain physical characteristics of crystalline polypropylene intended for use in fiber-forming applications.

Still another object of this invention is to utilize a conventional class of cationic dyes for permanently dyeing multifilament polypropylene.

These and other objects and advantages of the present invention will be better understood by those skilled in the art upon consideration of the detailed discussion and example presented hereinbelow.

The sulfonate salts contemplated for admixing with the crystalline polyolefins for purposes outlined include the metal salts of a variety of high molecular weight alkaryl sulfonic acids i.e. alkaryl hydrocarbyl sulfonic acids. Such salts are commonly referred to in the art as oil-soluble sulfonates and are used extensively as lubricating oil additives. Because of their oil-soluble nature they are completely compatible with the crystalline polyolefins. The aforesaid sulfonic acids are generally classified as either petroleum sulfonic acids or those derived synthetically as by-products of various petroleum operations. As indicated, both of the foregoing classes of sulfonic acids are applicable in the practice of this invention. Since, however, the use of these sulfonic acids, or rather the metal sulfonate salts thereof, for the instant purposes is non-analogous to their use in a lubricating composition, it is frequently desirable to modify most of the oil-soluble sulfonates primarily designed for use in the latter application. Most of the sulfonates marketed as lube oil additives contain a minor amount of free oil; that is, organic compounds which are not readily sulfonatable. While an inert component of this type has no adverse effect in a compounded lubricating oil composition, it is readily apparent that it would not be advantageous to include such an inert material in a fiber-forming polyolefin composition. Accordingly, it is desirable to de-oil the commercially available oil-soluble sulfonate if the content of free oil exceeds about 10%. This can be achieved by washing the sulfonate with a polar solvent in order to provide a sulfonate enriched phase from which the sulfonate in a more concentrate form can be readily recovered.

The color of the oil-soluble sulfonates primarily marketed for use as lube oil additives are invariably very dark. It is, therefore, a practical requisite that the sulfonate employed as a modifier in a fiber-forming polyolefin in accordance with this invention be treated so as to improve the color thereof. A variety of purification methods exist for decolorizing the oil-soluble sulfonates. As a matter of fact, it is possible to produce amber colored sulfonate salts from any of the oil-soluble sulfonic acids referred to. In the absence of such treatment these products range in color from medium brown to a deep mahogany.

Of the petroleum sulfonic acids that are especially applicable, there are the mahogany acids. These acids are a complex mixture of aromatic and alicyclic sulfonic acids produced in the conventional sulfuric acid refining of lubricating oil distillates. The industrial production of mahogany sulfonic is well known in the art and such products are readily available commercial items.

Another exemplary class of sulfonic acids whose metal salts can be used in accordance with this invention are those obtained by sulfonating a synthetic alkaryl. These alkaryls are readily produced in accordance with the Friedel-Crafts reaction wherein an aromatic compound is condensed with either an olefin, alkyl halide or alcohol. Suitable arenes for this purpose include benzene and the lower alkyl benzenes. Alkylates of this type whose metal sulfonate salts are oil-soluble are those in which the alkyl group or groups attached to the aromatic nucleus total at least about 18 carbon atoms. The preferred alkyl benzenes are those having an average molecular weight from about 350 to 700.

An economical source of synthetic alkaryls which provide oil-soluble metal sulfonate salts is the by-product obtained in the production of water-soluble detergent alkylates. The latter are ordinarily prepared by reacting a propylene tetramer or a chloride of detergent range paraffin, i.e., a $C_{10}$-$C_{16}$ linear paraffin, with benzene. Upon recovery of the detergent alkylate fraction, a higher boiling second fraction consisting essentially of monophenyl alkanes is then recovered. The latter fraction is a complex mixture of alkyl benzenes, di-alkyl benzenes and tetralins having an average molecular weight between about 350–700.

Still another type of a synthetic alkaryl useful herein is represented by the sulfonatable product obtained by disproportioning a n-alkyl benzene in the presence of aluminum chloride catalyst to result in the formation of a di-(n) alkylbenzene in which the alkyl groups are predominantly oriented in the para position. The resultant products are almost completely sulfonatable. The molecular weight of this class of preferred alkylates averages between about 400 and 425. The sulfonate derivatives of these alkylates are characterized in having excellent color, solubility and stability properties.

The preparation of the metallic salts of the hereinabove described sulfonic acids is well known in the art. The sulfonate salts of all metals can be prepared and all of such salts can be utilized in accordance with this invention. An exemplary method for preparing the metal salts of the sulfonic acids contemplated herein can be found described in U.S. application Ser. No. 124,315, filed July 17, 1961, now Patent No. 3,277,002.

The preferred metals for preparing the salts of the sulfonic acids are those in groups IA, IIA, IIB and IIIA of the Periodic Table. Especially preferred metals are magnesium, calcium and zinc. An unusual characteristic of zinc is that it results in a sulfonate salt which exhibits better color than the sulfonic acid used in the preparation of the salt.

The amount of the sulfonate salt that can be incorporated into the polymer for the purpose of providing uniformly distributed dye sites ranges from about 0.5 to 20% based on a combined weight of the sulfonate and polyolefin. The preferred range of sulfonate salt in the composition of this invention is from about 1 to 10% on the aforesaid basis. The metal sulfonate salts can be uniformly incorporated into the polyolefin by compounding the polyolefin in a molten state with the salt in a suitable mixing device such as a Banbury mill.

The procedure for dyeing substrates prepared from the compositions of this invention follows the conventionally observed practices in this art. In piece dyeing multifilaments, the fibers are first scoured and then run into a dye bath containing a small amount of the water-soluble dye, usually not in excess of about 3%, at a moderately elevated temperature in the order of about 140° F. Thereafter, the temperature of the dye bath is slowly raised to a boil and boiling continued for an hour to two hours. The dyed material is rinsed and scoured at about 160° F., rinsed again and then dried.

While our invention has special utility in connection with the dyeing of fiber-forming polyolefins in multifilament form, its usefulness is not limited to such an application nor to the specific type of polymers prevalently utilized therein. For example, both the low and high density polyethylenes as well as co-polymers of a major amount of ethylene and a minor amount of other α-olefins, vinyl or vinylidene monomers find widespread use in production of free films. Such substrates can be uniformly and permanently dyed in accordance with this invention. Also the aftermentioned free films can be printed by suitably contacting the surface thereof with an ink whose prime coloring constituent is a cationic dye of the type hereinbefore described.

In order to illustrate to those skilled in the art a manner for implementing the inventive concept presented herein, the following working example is set forth. As indicated, this example is given primarily by way of illustration and accordingly, any enumeration of detail contained therein not embraced in the appended claims is not to be interpreted as a limitation on the invention.

EXAMPLE

In this example a free film of a crystalline polyolefin was the selected type of substrate for illustrating the invention. The use of a substrate of this type, because of its readily measurable light transmission property, permits demonstrating the excellent dyeability characteristics of our novel composition in objective terms.

The crystalline polyolefin employed in this example was a commercially available general purpose molding grade of polypropylene. The sulfonate salts tested herein were incorporated into the polypropylene by mixing these components in a laboratory Banbury mixer. After suitably mixing in order to obtain complete dispersion of the sulfonate salt within the composition, same was then compression molded to provide films of from 5–10 mils in thickness.

The sulfonic acid employed to prepare the zinc and magnesium salts thereof tested in this example was a product resulting from the sulfonation of a di-n-alkylbenzene having a molecular weight of about 420. The active content of the sulfonation product was in excess of 95%.

Free films of the polypropylene-sulfonate composition were dyed observing a conventional dyeing procedure. This procedure consisted of first scouring the test film sample at about 140° F. and thereupon boiling the sample in a dye bath consisting of an aqueous solution of about 0.4% of the dye based on the weight of the film sample. Following dyeing, the films were rinsed and then dried. The intensity of each dyed sample was measured as percent light transmission employing a standard reflectance meter for this purpose. In order to ascertain the degree to which the dye had become permanently bound to substrate, the dyed films were boiled in a detergent solution containing 1.0% of a heavy duty detergent composition for one hour. Light transmissions values were noted again for the dyed films treated in this manner.

The results of this series of tests are tabulated in the following Table I wherein other pertinent data with respect to the individual test films are given.

TABLE I

| Test Film No.: | Composition | Dye | Percent Light Transmission | |
|---|---|---|---|---|
| | | | Dyed Film | Detergent Washed Dyed Film |
| 1 | Control PP | Nabor Blue 2G (CI Basic Blue 21, an anthraquinone dye). | 94 | 95 |
| 2 | PP+5% Zn Sulfonate | do | 68 | 82 |
| 3 | PP+10% Zn Sulfonate | do | 60 | 64 |
| 4 | Control PP | Nabor Yellow LF | 94 | 94 |
| 5 | PP+5% Zn Sulfonate | do | 60 | 62 |
| 6 | PP+10% Zn Sulfonate | do | 65 | 67 |
| 7 | Control PP | Nabor Bril. Red 4G (CI Basic Red 14, a cyanine dye). | 92 | 92 |
| 8 | PP+5% Zn Sulfonate | do | 56 | 62 |
| 9 | PP+10% Zn Sulfopate | do | 37 | 45 |
| 10 | Control PP | Nabor Blue 2G | 89 | |
| 11 | PP+5% Mg Sulfonate | do | 53 | |
| 12 | PP+10% Mg Sulfonate | do | 23 | |

Test samples of the compositions used to prepare Test Film Nos. 10, 11 and 12 in Table I were evaluated for tensile strength properties, elongation and melt index. The results are set forth in Table II.

TABLE II

| Composition | Tensile, p.s.i.[1] | | Percent Elong.[1] | Melt Index,[2] gm./10 min. |
|---|---|---|---|---|
| | Yield | Break | | |
| Control PP | 4,158 | 3,796 | 628 | 16.6 |
| PP+5% Mg Sulfonate | 3,848 | 3,896 | 734 | 19.8 |
| PP+10% Mg Sulfonate | 3,561 | 3,964 | 843 | 24.0 |

[1] Tensile strength and elongation properties determined by ASTM-D-638-61T.
[2] Melt index determined by ASTM-D-1238-57T at 230% and 2,160 gms. weight.

We claim:

1. A new fiber or film, which is dyeable with cationic dyes, consisting essentially of a crystalline polymer of an aliphatic α-olefin containing from 3 to 6 carbon atoms having homogeneously dispersed therein from about 0.5 to about 20 percent, based on total weight of the composition, of oil-soluble lithium and polyvalent metallic salts of an alkaryl hydrocarbyl sulfonic acid, the alkaryl moiety of said alkaryl sulfonic acid having a molecular weight between about 350 and about 700.

2. A fiber or film in accordance with claim 1 wherein said α-olefin is propylene.

3. A fiber or film in accordance wtih claim 1 wherein said α-olefin is 4-methyl pentene-1.

4. A fiber or film in accordance with claim 2 wherein the alkaryl moiety of said alkaryl hydrocarbyl sulfonic acid is a di-n-alkyl benzene having a molecular weight between about 400 and 425 and wherein the polyvalent metal is selected from groups IIA, IIB, and IIIA of the Periodic Table.

5. A fiber or film in accordance with claim 1 wherein said metal is zinc.

6. A fiber or film in accordance with claim 1 wherein said metal is magnesium.

7. A fiber or film in accordance with claim 1 wherein said metal is lithium.

References Cited

UNITED STATES PATENTS

| 2,766,214 | 10/1956 | Erchak. | |
| 2,910,461 | 10/1959 | Nowlin et al. | 260—94.9 |
| 3,039,840 | 6/1962 | Sawaya | 8—55 |
| 3,056,643 | 10/1962 | Kutner | 8—34 |
| 3,069,220 | 12/1962 | Dawson | 8—55 |
| 3,164,438 | 1/1965 | Thomas | 8—46 |
| 3,207,725 | 9/1965 | Pfeifer. | |
| 3,314,743 | 4/1967 | Gagliardi | 8—55 XR |
| 3,337,652 | 8/1967 | Press | 8—55 XR |

GEORGE F. LESMES, Primary Examiner

D. LEVY, Assistant Examiner

U.S. Cl. X.R.

8—100, 55, 31, 4; 264—78

UNITED STATES PATENT OFFICE
CERTIFICATE OF CORRECTION

Patent No. 3,468,864                           September 23, 1969

Orwin G. Maxson et al.

It is certified that error appears in the above identified
patent and that said Letters Patent are hereby corrected as
shown below:

Column 2, line 12, "nising" should read -- nishing --.
Column 5, line 16, "Sulfopate" should read -- Sulfonate --.

Signed and sealed this 31st day of March 1970.

SEAL)
Attest:

Edward M. Fletcher, Jr.                WILLIAM E. SCHUYLER, JR.
Attesting Officer                          Commissioner of Patents